INVENTORS
WRIGHT H. SCIDMORE
ROBERT J. WOLFE 3,549,231
LENS PRESCRIPTION FOR OPTICAL SYSTEM FOR
DAY-NIGHT PERISCOPIC SIGHT
Wright H. Scidmore, Langhorne, and Robert J. Wolfe,
Philadelphia, Pa., assignors to the United States of
America as represented by the Secretary of the Army
Filed Dec. 8, 1969, Ser. No. 883,080
Int. Cl. G02b 23/08
U.S. Cl. 350—52           1 Claim

ABSTRACT OF THE DISCLOSURE

Specific lens and components values are prescribed for a periscope for use with military tanks, the periscope being compact and usable with a 3-stage image intensifier tube, and possessing high power day and night sighting capabilities as well as unaided day vision.

---

The invention described herein may be manufactured, used and licensed by or for the Government for governmental purposes without the payment to us of any royalties thereon.

Reference is hereby made to patent application, Ser. No. 805,563, of Wright H. Scidmore for "Optical System for Day-Night Periscopic Sight," filed Mar. 10, 1069 and assigned to the same assignee of this patent application.

This invention relates to optical instruments and more particularly concerns specific lens prescription for a compact periscopic optical instrument having high power day and night sighting capabilities coupled with means for unaided binocular day vision.

The inventive periscope described herein consists of four major sub-assemblies, the head assembly, the body assembly, the tube assembly and the reticle projector assembly.

The head assembly comprises a housing containing an entrance window and a rotatable mirror which provides the means for rotating the line of sight from 18 degrees in depression to 60 degrees in elevation. Rotation of the mirror is accomplished by means of an internal geared drive system which is coupled to the machine gun by a mechanical linkage. It is also linked to the major weapon electrically to insure that the periscope line of sight will be synchronized with the main weapon.

The body assembly consists of an aluminum center body assembly and a front and rear cover assembly. The body contains elements of all four optical systems, the filter wheel and operating mechanism, a cavity for the tube housing, and a housing for the regulator assembly. Externally, the filter knob, rheostat knob, and the headrest with its associated adjustments and the eyepiece assembly are mounted on the rear wall; the diopter adjustment knob on the bottom of the center body; the flip mirror lever and reticle projector assembly are mounted on the right side of the housing.

The tube assembly consists of a cover and tube housing and a housing for the oscillator assembly. The cover contains internal cavities for optical elements of the daylight and passive systems. The focus knob for adjusting the image intensifier tube is mounted on the bottom of the cover.

The reticle projector is mounted on the right side of the periscope. It contains several optical elements of the reticle projection system, and the electro-mechanical components of the reticle drive system. An electrical connector is mounted on a rear wall of the housing.

The optical systems of our inventive periscope consists of the unity-power system, the eight-power daylight system, the ten power "passive" or night system, and the optical system of the reticle projector. The head assembly contains optical elements common to the unit power, the 8× daylight system, and the 10× "passive" system. In the 8× and 10× "passive" system all light transmitting elements are coated with reflection reducing films to increase the light transmission through the periscope. The coatings on the optical elements preceding the image intensifier tube are such as to be optimum over the spectral range of the photocathode surface.

The aforementioned provides a general description of our periscopic tank sight capable of use under low levels of illumination, the periscope being compact and yet usable with a 3-stage intensifier tube. Prior art telescopic tank sights providing night vision and unity power capabilities were, for the most part, usable only with single stage intensifier tubes which were short in length and having a curved photocathode. The 3-stage intensifier tube is about three times as long as its single stage counterpart, has a flat cathode and is capable of much greater light amplification thus obviating any necessity of an active mode, such as a searchlight, for example, which may be readily detectable by the enemy. Another prior art telescopic-tank sight usable with a 3-stage image intensifier tube, while providing a high power night sighting capability and unaided binocular day vision capability, was incapable of providing high power day sighting capability.

It is therefore a principal object of this invention to provide specific and suitable lens and component values for use with an optical system having high power day and night sighting capabilities as well as unaided binocular day vision capability.

The exact nature of this invention as well as other objects and advantages thereof will be readily apparent from consideration of the following description and drawings wherein.

Figure 1:
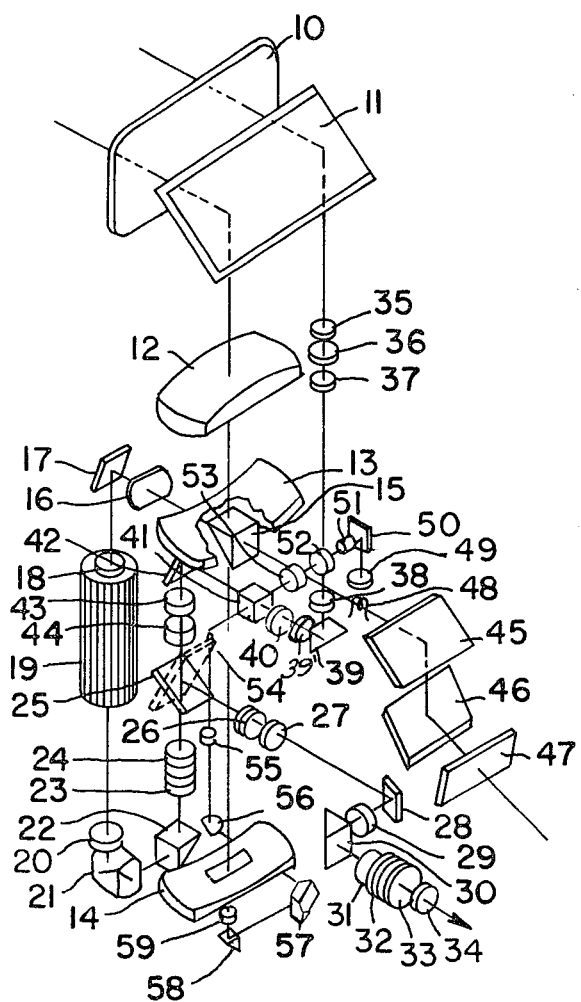
FIG. 1 illustrates a diagrammatic view of the optical system of our inventive periscope.
Figure 2:
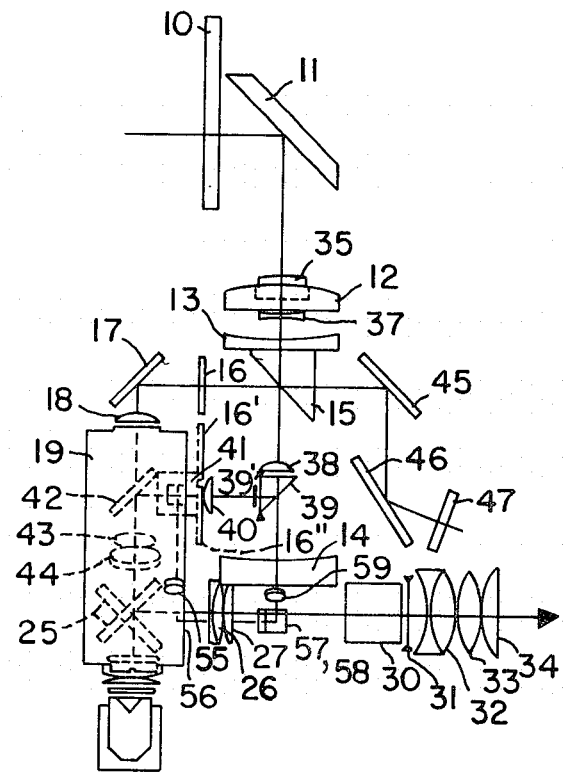
FIGS. 2 and 3 illustrate other views of our optical system.
Figure 3:
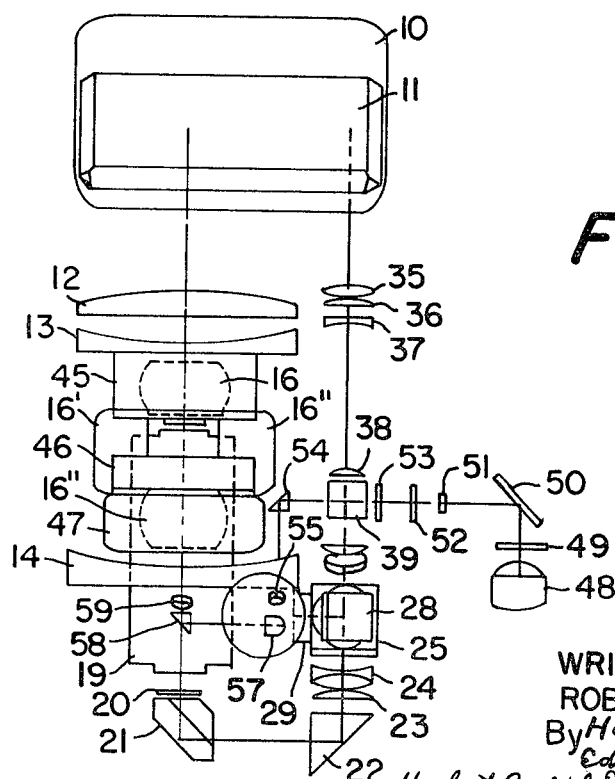

Referring now the drawings, light enters the instrument through the entrance window 10 and is reflected from the head mirror 11 into the body assembly for funneling into the high power day, the high power night and the unity power day systems. The unity power surveillance channel is always available for use. Either the 8× day or 10× night channel can be selected for use by proper rotation of flip mirror 25.

Light rays which contribute to the formation of an image for the 8× day sight are transmitted through entrance window 10, reflected from head mirror 11 into the telephoto triplet objective 35, 36 and 37. The light is then transmitted through collective lens 38 and 90° prism 39 and brought to a focus at the field stop 39' which is located at the exit surface of prism 39. The light is then transmitted through collective lens 40 and beam-splitter prism 41, reflected from fixed mirror 42 and collimated by the first erector lens assembly 43 and 44. Light is then reflected from flip mirror 25, transmitted through the second erector lens assembly 26 and 27, reflected from fixed mirror 28, transmitted through the negative field lens 29 and 90° prism 30 and focused at diaphragm 31. The light is then transmitted through field lens 32, center lens 33, the eye lens 34 which collimate the light for ease of observation. Dioptral adjustment of ±4 diopters is provided by longitudinal adjustment of the second erector lens assembly. The day sight provides a magnification of 8×, a field of view of 8 degrees, and an exit pupil diameter of 5 mm.

Light rays from the head assembly which contribute to the formation of an image for the night sight are transmitted through the outer area of corrector lenses 12 and 13 to the primary mirror 14. The primary mirror folds the optical path back 180° and converges the light to form an image after being reflected at 90° prism-mirror 15, transmitted through filter 16, reflected at 90° mirror 17, and transmitted through field-flattener lens 18 at the light sensitive surface of the image intensifier tube 19. Rays from the visible image formed on the screen of the image intensifier tube are transmitted through window 20, Amici prism 21, 90° prism 22, and are collimated by the first erector lens assembly 23 and 24. The rays are then reflected from the flip mirror 25 into the common eyepiece assembly consisting of the second erector lens assembly 26 and 27, mirror 28, lens 29, prism 30, diaphragm 31, lens 32, lens 33, and lens 34. Focusing of the image tube is accomplished by moving field flattener lens 18, the image intensifier tube 19, window 20, Amici prism 21, 90° prism 22, and the first erector lens assembly 23 and 24 as a unit such that the dioptral setting is not affected. The dioptral adjustment of ±4 diopters is common to the day sight and is accomplished by longitudinal adjustment of the second erector lens assembly 26 and 27. The night sight provides a magnification of 10×, a field of view of 5½° and an exit pupil of 7 mm. The cata-dioptric objective lens consisting of corrector lenses 12 and 13, primary mirror 14, 90° prism-mirror 15, filter 16, mirror 17, and field-flattener lens 18, has a focal length of 10.2 inches, an F-number of 1.57 in the horizontal meridian and 3.14 in the vertical meridian, and a T-number of approximately 3.1. The filter assembly is comprised of a clear glass window 16, two neutral density filters 16' and 16", and an opaque disc 16'". The opaque disc protects the image intensifier tube from possible damage when the night sight is not in use. Neutral density filters 16' and 16", and opaque disc 16'" are not shown in FIG. 1 to avoid confusion and clutter. The filter is manually rotatable and provides compensation for differing ambient levels of illumination of the target scene.

Light rays contributing to the unit power field are transmitted from the head assembly through the center portion of corrector lenses 12 and 13, are deviated 90° by (1) prism-mirror 15 and (2) mirror 45 and deviated 70° by mirror 46 and transmitted through window 47 to the observer's eyes. The corrector lenses are approximately afocal. The window 47 is a weak negative lens of approximately ½ diopter thereby requiring a small, desirable amount of eye accommodation when using the unit power vision system.

Light emitted from lamp 48 is transmitted through window 49 and reflected by mirror 50 illuminating reticle 51. The light from the reticle is then projected through windows 52 and 53 and is combined with the 8× target image at beam-splitter prism 41. The light transmitted through the beam-splitter prism is deviated 90° by prism 54 and is collimated by relay lens 55. This light is then deviated 90° by (1) 90° prism 56, (2) Amici prism 57 and (3) 90° prism 58 and transmitted through lens 59 and the central clear area A of mirror-lens 14 and combined with the night sight target image at 90° prism-mirror 15. Factory alinement of the day and night sights is accomplished by adjusting prisms 57 and 58. Boresight adjustment for both the day and night sights is accomplished in the field by translation of reticle 51 in azimuth and elevation.

Lens data pertaining to the optical systems of our day sight, night sight and reticle projector systems are listed below, all dimensions being in inches:

8× DAY SIGHT

| Component | Radius | Thickness | Glass type |
|---|---|---|---|
| Lens 35 | +3.874; −17.655 | .331; .010 | 517–645; air. |
| Lens 36 | +3.874; −17.655 | .331; .382 | 517–645; air. |
| Lens 37 | −7.506; +5.281 | .100; 4.279 | 720–293; air. |
| Lens 38 | +1.971; ±∞ | .200; .098 | 580–410; air. |
| Prism 39 | ±∞; ±∞ | 1.200; 1.412 | 649–338; air. |
| Lens 40 | ±∞; −4.936 | .200; .250 | 617–549; air. |
| Beam-splitter prism 41 | ±∞; ±∞ | 1.200; .700 | 517–645; air. |
| Mirror 42 | ±∞ | 1.306 | Air. |
| Lens 43 | +17.079; −5.030 | .190; .005 | 517–645; air. |
| Lens 44 | +28.265; −2.158; −6.053 | .267; .100; 1.530 | 517–645; 649–338; air. |
| Flip mirror 25 | ±∞ | 2.300 | Air. |
| Lens 26 | +38.314; +3.536; −10.146 | .100; .285; .006 | 649–338; 517–645; air. |
| Lens 27 | +3.304; +14.257 | .255; 4.434 | 517–645; air. |
| Mirror 28 | ±∞ | .975 | Air. |
| Lens 29 | −1.183; +1.285; −5.814 | .100; .425; .050 | 620–603; 751–278; air. |
| Prism 30 | ±∞; ±∞ | 1.800; .093 | 649–338; air. |
| Diaphragm 31 | ±∞ | .480 | Air. |
| Lens 32 | −4.005; +2.177; −2.177 | .110; .975; .011 | 751–278; 620–603; air. |
| Lens 33 | +3.423; −8.110 | .501; .011 | 620–603; air. |
| Lens 34 | +2.032; +18.142 | .485 | 620–603. |

NIGHT SIGHT OBJECTIVE

| Component | Radius | Thickness | Glass type |
|---|---|---|---|
| Lens 12 | +21.135; −76.911 | .650; .800 | 517–645; air. |
| Lens 13 | −16.513; ±∞ | .312; 6.138 | 517–645; air. |
| Mirror 14 | −21.209 | 5.038 | Air. |
| Mirror 15 | ±∞ | 2.312 | Air. |
| Filter 16 | ±∞; ±∞ | .150; 1.900 | 517–645; air. |
| Mirror 17 | ±∞ | .800 | Air. |
| Lens 18 | +2.005; +4.507 | .280; .139 | 517–645; air. |
| Photo cathode | ±∞ | | |

NIGHT SIGHT EYEPIECE-RELAY SYSTEM

| Component | Radius | Thickness | Glass type |
|---|---|---|---|
| Image tube screen | ±∞ | .490 | Air. |
| Window 20 | ±∞; ±∞ | .100; .244 | 517–645; air. |
| Prism 21 | ±∞; ±∞ | 2.220; 2.840 | 517–645; air. |
| Prism 22 | ±∞; ±∞ | 1.800; .430 | 649–338; air. |
| Lens 23 | −115.340; −4.841 | .240; .006 | 523–586; air. |
| Lens 24 | +4.738; −2.287; +14.106 | .437; .100; 1.593 | 523–586; 580–410; air. | flip-mirror 25, lens 26, lens 27, mirror 28, lens 29, prism 30, diaphragm 31, lens 32, lens 33 and lens 34, same as shown for 8× day sight.

RETICLE PROJECTOR FOR 8× DAY SIGHT

| Component | Radius | Thickness | Glass type |
|---|---|---|---|
| Reticle 51 | ±∞; ±∞ | .100; .783 | 517–645; air. |
| Window 52 | ±∞; ±∞ | .100; .870 | 517–645; air. |
| Window 53 | ±∞; ±∞ | .100; .300 | 517–645; air. |
| Beam splitter prism 41 | ±∞; ±∞ | 1.200; .700 | 517–645; air. | mirror 42, lens 43, lens 44, mirror 25, lens 26, lens 27, mirror 28, lens 29, prism 30, diaphragm 31, lens 32, lens 33 and lens 34, same as shown for 8× day sight.

RETICLE PROJECTOR FOR 10× NIGHT SIGHT

| Component | Radius | Thickness | Glass type |
|---|---|---|---|
| Reticle 51 | ±∞; ±∞ | .100; .783 | 517–645; air. |
| Window 52 | ±∞; ±∞ | .100; .870 | 517–645; air. |
| Window 53 | ±∞; ±∞ | .100; .300 | 517–645; air. |
| Beam-splitter prism 41 | ±∞; ±∞ | 1.200; 1.100 | 517–645; air. |
| Prism 54 | ±∞; ±∞ | .600; 2.349 | 573–574; air. |
| Lens 55 | +3.560; +1.560; −15.170 | .080; .130; .510 | 617–366; 523–586; air. |
| Prism 56 | ±∞; ±∞ | .600; 2.250 | 573–574; air. |
| Prism 57 | ±∞; ±∞ | 1.024; 2.038 | 517–645; air. |
| Prism 58 | ±∞; ±∞ | .600; .245 | 573–574; air. |
| Lens 59 | +20.040; −1.654; −5.059 | .120; .080; .255 | 523–586; 573.425 air. |
| Mirror-lens 14 | ±∞; +21.209 | .750; 5.038 | 508–610; air. |
| Mirror 15 | ±∞ | 2.312 | Air. |

Filter 16, mirror 17, lens 18 and photocathode are same as shown above for night sight objective.

We claim:
1. An optical system having optical components arranged in the order recited below and having numerical data as set forth in the following table wherein all dimensions are expressed in inches:

8X DAY SIGHT

| Component | Radius | Thickness | Glass type |
|---|---|---|---|
| Upper telephoto triplet lens (35): | | | |
| Entrance surface | +3.874 | .331 | 517–645. |
| Exit surface | −17.655 | .010 | Air. |
| Intermediate telephoto triplet lens (36): | | | |
| Entrance surface | +3.874 | .331 | 517–645. |
| Exit surface | −17.655 | .382 | Air. |
| Lower telephoto triplet lens (37): | | | |
| Entrance surface | −7.506 | .100 | 720–293. |
| Exit surface | +5.281 | 4.279 | Air. |
| 1st collective lens (38): | | | |
| Entrance surface | +1.971 | .200 | 580–410. |
| Exit surface | ±∞ | .098 | Air. |
| 1st 90° prism (39): | | | |
| Entrance surface | ±∞ | 1.200 | 649–338. |
| Exit surface | ±∞ | 1.412 | Air. |
| 2nd collective lens (40): | | | |
| Entrance surface | ±∞ | .200 | 617–549. |
| Exit surface | −4.936 | .250 | Air. |
| Beam-splitter prism (41): | | | |
| Entrance surface | ±∞ | 1.200 | 517–645. |
| Exit surface | ±∞ | .700 | Air. |
| Mirror (42) | ±∞ | 1.306 | Air. |
| Upper 1st erector lens (43): | | | |
| Entrance surface | +17.079 | .190 | 517–645. |
| Exit surface | −5.030 | .005 | Air. |
| Lower 1st erector lens (44): | | | |
| Entrance surface | +28.265 | .267 | 517–645. |
| Intermediate surface | −2.158 | .100 | 649–338. |
| Exit surface | −6.053 | 1.530 | Air. |
| Flip mirror (25) | ±∞ | 2.300 | Air. |
| Forward 2nd erector lens (26): | | | |
| Entrance surface | +38.314 | .100 | 649–338. |
| Intermediate surface | +3.536 | .285 | 517–645. |
| Exit surface | −10.146 | .006 | Air. |
| Rearward 2nd erector lens (27): | | | |
| Entrance surface | +3.304 | .255 | 517–645. |
| Exit surface | +14.257 | 4.434 | Air. |
| Fixed mirror (28) | ±∞ | .975 | Air. |
| Negative field lens (29): | | | |
| Entrance surface | −1.183 | .100 | 620–603. |
| Intermediate surface | +1.285 | .425 | 751–278. |
| Exit surface | −5.814 | 0.50 | Air. |
| 2nd 90° prism (30): | | | |
| Entrance surface | ±∞ | 1.800 | 649–338. |
| Exit surface | ±∞ | .093 | Air. |
| Diaphragm (31) | ±∞ | .480 | Air. |
| Field lens (32): | | | |
| Entrance surface | −4.005 | .110 | 751–278. |
| Intermediate surface | +2.177 | .975 | 620–603. |
| Exit surface | −2.177 | .011 | Air. |
| Center lens (33): | | | |
| Entrance surface | +3.423 | .501 | 620–603. |
| Exit surface | −8.110 | .011 | Air. |
| Eye lens (34): | | | |
| Entrance surface | +2.032 | .485 | 620–603. |
| Exit surface | +18.142 | | |

NIGHT SIGHT OBJECTIVE

| Component | Radius | Thickness | Glass type |
|---|---|---|---|
| Upper corrector lens (12): | | | |
| Entrance surface | +21.135 | .650 | 517–645. |
| Exit surface | −76.911 | .800 | Air. |
| Lower Corrector Lens (13): | | | |
| Entrance surface | −16.513 | .312 | 517–645. |
| Exit surface | ±∞ | 6.138 | Air. |
| Primary mirror (14) | −21.209 | 5.038 | Air. |
| Prism mirror (15) | ±∞ | 2.312 | Air. |
| Filter (16): | | | |
| Entrance surface | ±∞ | .150 | 517–645. |
| Exit surface | ±∞ | 1.900 | Air. |
| 90° mirror (17) | ±∞ | .800 | Air. |
| Field flattener lens (18): | | | |
| Entrance surface | +2.005 | .280 | 517–645. |
| Exit surface | +4.507 | .139 | Air. |
| Photocathode (19) (image intensifier tube). | ±∞ | | |

NIGHT SIGHT EYEPIECE—RELAY SYSTEM

| Component | Radius | Thickness | Glass type |
|---|---|---|---|
| Image tube screen | ±∞ | .490 | Air. |
| 1st window (20): | | | |
| Entrance surface | ±∞ | .100 | 517–645. |
| Exit surface | ±∞ | .244 | Air. |
| 1st amici prism (21): | | | |
| Entrance surface | ±∞ | 2.220 | 517–645. |
| Exit surface | ±∞ | 2.840 | Air. |
| 3rd 90° prism (22): | | | |
| Entrance surface | ±∞ | 1.800 | 649–338. |
| Exit surface | ±∞ | .430 | Air. |
| Lower 3rd erector lens (23): | | | |
| Entrance surface | −115.340 | .240 | 523–586. |
| Exit surface | −4.841 | .006 | Air. |
| Upper 3rd erector lens (24): | | | |
| Entrance surface | +4.738 | .437 | 523–586. |
| Intermediate surface | −2.287 | .100 | 580–410. |
| Exit surface | +14.106 | 1.593 | Air. | flip mirror (25), forward 2nd erector lens (26), rearward 2nd erector lens (27), fixed mirror (28), negative field lens (29), 2nd 90° prism (30), diaphragm (31), field lens (32), center lens (33), and eye lens (34) are presented under said 8× day sight;

RETICLE PROJECTOR FOR 8X DAY SIGHT

| Component | Radius | Thicknesss | Glass type |
|---|---|---|---|
| Reticle (51): | | | |
| Entrance surface | ±∞ | .100 | 517–645. |
| Exit surface | ±∞ | .783 | Air. |
| 2nd Window (52): | | | |
| Entrance surface | ±∞ | .100 | 517–645. |
| Exit surface | ±∞ | .870 | Air. |
| 3rd Window (53): | | | |
| Entrance surface | ±∞ | .100 | 517–645. |
| Exit surface | ±∞ | .330 | Air. | beam-splitter prism (41), mirror (42), upper 1st erector lens (43), lower 1st erector lens (44), flip mirror (25), forward erector lens (26), rearward erector lens (27), fixed mirror (28), negative field lens (29), 2nd 90° prism (30), diaphragm (31), field lens (32), center lens (33), and eye lens (34) are presented under said 8× day sight; reticle (51), 2nd window (52) and 3rd window (53) are presented under said reticle projector for 8× day sight;

RETICLE PROJECTOR FOR 10X NIGHT SIGHT

| Component | Radius | Thickness | Glass type |
|---|---|---|---|
| Beam-splitter prism (41): | | | |
| Entrance surface | ±∞ | 1.200 | 517–645. |
| Exit surface | ±∞ | 1.100 | Air. |
| 4th 90° prism (54): | | | |
| Entrance surface | ±∞ | .600 | 573–574. |
| Exit surface | ±∞ | 2.349 | Air. |
| Relay lens (55): | | | |
| Entrance surface | +3.560 | .080 | 617–366. |
| Intermediate surface | +1.560 | .130 | 523–586. |
| Exit surface | −15.170 | .510 | Air. |
| 5th 90° prism (56): | | | |
| Entrance surface | ±∞ | .600 | 573–574. |
| Exit surface | ±∞ | 2.250 | Air. |
| 2nd amici prism (57): | | | |
| Entrance surface | ±∞ | 1.024 | 517–645. |
| Exit surface | ±∞ | 2.038 | Air. |
| 5th 90° prism (58): | | | |
| Entrance surface | ±∞ | .600 | 573–574. |
| Exit surface | ±∞ | .245 | Air. |
| Lens (59): | | | |
| Entrance surface | +20.040 | .120 | 523–586. |
| Intermediate surface | −1.654 | .080 | 573–425. |
| Exit surface | −5.059 | .255 | Air. |
| Mirror-lens (14): | | | |
| Entrance surface | ±∞ | .750 | 508–610. |
| Exit surface | +21.209 | 5.038 | Air. | prism mirror (15), filter (16), 90° mirror (17), field flattener lens (18), and photocathode (19) are presented under said night sight objective.

References Cited

UNITED STATES PATENTS 3,454,322  7/1969  Seidmore et al. _____ 350—10X

DAVID SCHONBERG, Primary Examiner

T. H. KUSMER, Assistant Examiner

U.S. Cl. X.R.

350—10, 18, 28, 34